(12) United States Patent
Kim et al.

(10) Patent No.: US 12,556,401 B2
(45) Date of Patent: Feb. 17, 2026

(54) METHOD AND APPARATUS FOR DELIVERING SIGNED CONTENT

(71) Applicant: KAKAO CORP., Jeju-si (KR)

(72) Inventors: Chun Ho Kim, Seongnam-si (KR); Yong Ha Yoo, Seongnam-si (KR); Woo Young Park, Seongnam-si (KR); Myung Jun Kim, Seongnam-si (KR)

(73) Assignee: KAKAO CORP., Jeju-si (KR)

( * ) Notice: Subject to any disclaimer, the term of this patent is extended or adjusted under 35 U.S.C. 154(b) by 403 days.

(21) Appl. No.: 17/746,984

(22) Filed: May 18, 2022

(65) Prior Publication Data
US 2022/0376927 A1    Nov. 24, 2022

(30) Foreign Application Priority Data
May 18, 2021   (KR) .......................... 10-2021-0063989

(51) Int. Cl.
H04L 9/32       (2006.01)
H04L 51/04      (2022.01)

(52) U.S. Cl.
CPC ............ *H04L 9/3247* (2013.01); *H04L 51/04* (2013.01)

(58) Field of Classification Search
CPC ......... H04L 9/3247; G06F 21/33; G06F 21/64
See application file for complete search history.

(56) References Cited

U.S. PATENT DOCUMENTS

| | | | |
|---|---|---|---|
| 2015/0295922 A1* | 10/2015 | Dunn ...................... | G06F 21/32 713/176 |
| 2015/0365361 A1* | 12/2015 | Tomlinson ............ | H04L 9/3247 709/206 |
| 2016/0306525 A1* | 10/2016 | Dawson ................ | H04L 51/043 |
| 2020/0128010 A1* | 4/2020 | Kim ..................... | G06F 16/2246 |
| 2023/0198751 A1* | 6/2023 | Medvinsky ........... | H04L 9/0897 713/170 |

FOREIGN PATENT DOCUMENTS

| JP | 2003-36231 A | 2/2003 |
|---|---|---|
| JP | 2011-501578 A | 1/2011 |
| JP | 2014-535216 A | 12/2014 |
| KR | 10-2011-0065101 A | 6/2011 |
| KR | 10-2013-0086851 A | 8/2013 |
| KR | 10-2015-0061785 A | 6/2015 |

(Continued)

OTHER PUBLICATIONS

Aug. 22, 2023—(KR) Office Action—App. No. 10-2021-0063989 w/ translation, pp. 1-16.

(Continued)

*Primary Examiner* — Nelson S. Giddins
(74) *Attorney, Agent, or Firm* — Banner & Witcoff, Ltd.

(57) ABSTRACT

An electronic apparatus may include a processor configured to sign content being inputted in response to a input by a first user of the electronic apparatus using authentication information of the first user, a display configured to visualize a graphic representation indicating the signed content by applying an authentication representation corresponding to the authentication information to the graphic representation in response to the signing being successful, and a communicator configured to transmit the signed content to another electronic apparatus of a second user.

20 Claims, 6 Drawing Sheets

(56) References Cited

FOREIGN PATENT DOCUMENTS

| | | |
|---|---|---|
| KR | 10-2019-0053123 A | 5/2019 |
| KR | 10-2020-0038133 A | 4/2020 |
| WO | 2013063494 A1 | 5/2013 |

OTHER PUBLICATIONS

Jun. 14, 2023—Japanese Notice of Reasons for Refusal—JP 2022-081760.

Dec. 12, 2023—Japanese Notice of Reasons for Refusal—JP2022-081760.

Japanese Patent Office, Office Action (Notification of Reasons for Refusal), Japanese Application No. JP 2024-112718, dated Nov. 20, 2025 (English translation provided).

\* cited by examiner

METHOD AND APPARATUS FOR DELIVERING SIGNED CONTENT

CROSS-REFERENCE TO RELATED APPLICATION

This application claims the benefit of Korean Patent Application No. 10-2021-0063989 filed on May 18, 2021, at the Korean Intellectual Property Office, the entire disclosure of which is incorporated herein by reference for all purposes.

BACKGROUND

1. Field of the Invention

One or more example embodiments relate to a method and an apparatus for delivering signed content, and more particularly, to an apparatus for delivering content signed in a social networking service server or an instant messaging service, and a method of operating the apparatus.

2. Description of the Related Art

Recently, with the development of mobile smart devices, use of an online platform service to communicate with other users via network has increased. Representative examples of an online platform service for communicating with other users are a social networking service (SNS), which is an online platform to generate and strengthen social relationships through communication among users, sharing information, and expanding personal connections and an instant messaging service (IMS), which is an online platform for real-time content communication between two or more users. SNS and IMS platforms may also provide a subscription service for various products.

SUMMARY

According to an aspect, there is provided a method of delivering signed content, performed by an electronic apparatus, the method including signing content being inputted by a first user of the electronic apparatus using authentication information of the first user, visualizing a graphic representation indicating the signed content by applying an authentication representation corresponding to the authentication information to the graphic representation in response to the signing being successful, and transmitting signature information or the signed content to another electronic apparatus of a second user.

The signing of the content may include signing the content using the authentication information stored in the electronic apparatus before the content is inputted.

The signing of the content may include requesting signature authentication for signing each of one or more contents, in response to an attempt to sign the one or more contents, and signing content of which the signature authentication is successful among the one or more contents using the authentication information.

The signing of the content may include, in response to the signature authentication being successful, allowing one or more contents to be signed for a predetermined period of time.

The signing of the content may include, in response to signature authentication for signing being previously applied to a chat room with the second user, skipping the signature authentication and signing the content in the chat room.

The signing of the content may include receiving an input of the content in response to a signing input by the first user, and requesting signature authentication to sign the content at one or more of a time before the input of the content is received, a time when the input of the content is being received, and a time after the input of the content is received.

The content inputted by the first user may be previous content created by the first user before a signing input of the first user among contents displayed on a screen corresponding to a chat room with a second user account, and the transmitting may comprise transmitting, in response to a signing input of the first user, a signature information for the previous content.

The transmitting further comprises sending a request to at least one of the another electronic apparatus and a server to transition the previous content to signed content.

The method may further include receiving other content signed by a second user from the another electronic apparatus, and visualizing a graphic representation indicating the other content by applying an authentication representation corresponding to the second user to the graphic representation.

The transmitting of the signed content may include, in response to the input of the first user, forwarding the other content to another electronic apparatus of a third user while maintaining signature information of the other content.

The transmitting of the signed content may include forwarding, to another electronic apparatus of a third user, the other content to which signature information of the second user is applied by adding signature information of the first user to the other content.

The method may further include generating duplicated content by copying and pasting the signed content along with signature information, and removing an authentication representation from the duplicated content in response to detecting a change in the duplicated content.

The visualizing of the graphic representation may include applying, to the content, a graphic representation indicating an original author of the content as the authentication representation.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

The following detailed structural or functional description is provided as an example only and various alterations and modifications may be made to the examples. Here, examples are not to be construed as limited to the disclosure and should be understood to include all changes, equivalents, and replacements within the idea and the technical scope of the disclosure.

Terms, such as first, second, and the like, may be used herein to describe various components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component. The singular forms "a", "an", and "the" are intended to include the plural forms as well, unless the context clearly indicates otherwise.

Hereinafter, example embodiments will be described in detail with reference to the accompanying drawings. When describing the example embodiments with reference to the accompanying drawings, like reference numerals refer to like elements and any repeated description related thereto will be omitted.

Figure 1:
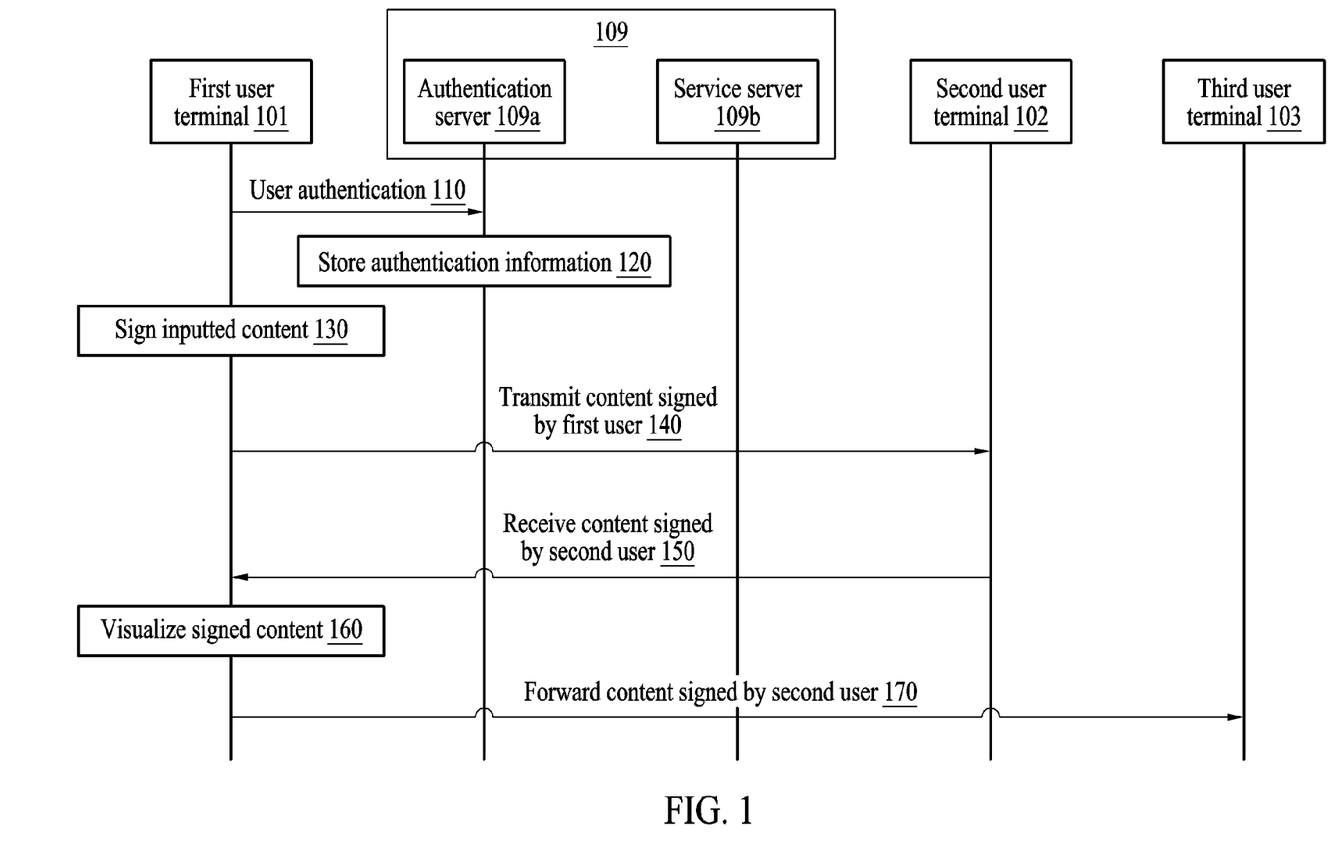
FIG. 1 is a diagram illustrating a method of delivering signed content according to an example embodiment.

FIG. 1 is a diagram illustrating a method of delivering signed content according to an example embodiment.

Referring to FIG. 1, a server 109 according to an example embodiment may include an authentication server 109a and a service server 109b. The authentication server 109a may perform user authentication to be described later, and the service server 109b may include a server that provides an instant messaging service (IMS) or a social networking service (SNS). The authentication server 109a and the service server 109b are illustrated separately in FIG. 1, however examples are not limited thereto, and the servers may be implemented as one server. Herein, the description mainly refers to the server 109b that provides an IMS.

A first user terminal 101 may be one of electronic apparatuses including a computer, a portable computer, a wireless phone, a mobile phone, a smartphone, a personal digital assistant (PDA), a web tablet, and the like. The user terminal 101 may refer to any apparatus that may install and execute a service application related to the server 109. Here, the first user terminal 101 may perform overall service operations such as service screen configuration, data input, data transmission and reception, and data storage under the control of the application. For example, the first user terminal 101 may access the server 109 through the application. Like first user terminal 101, the terms second user terminal 102 and third user terminal 103 may refer to all apparatuses capable of installing and executing a service application related to the server 109. For example, the first user terminal 101 may perform a process of executing user authentication related to a service with the authentication server 109a, and may receive a service from the service server 109b.

A user account is created when a user signs up for a service provided by the service server 109b, and the service server 109b may serve as a service platform that provides a service to a user account registered for a service such as an SNS, an IMS, and the like. Herein, a description of a user account mainly refers to an account registered for an IMS. Herein, for ease of description, a description of a first user account mainly applies to a first user, but examples are not limited thereto, and the description may also apply a first user, a first user account, a second user, a second user account, a third user, and a third user account.

Since the first user terminal 101 is provided with a service using the first user account, a first user account included in the following example embodiments may be construed as representing the first user terminal 101. Similarly, a second user account may represent the second user terminal 102, and a third user account may represent the third user terminal 103. A first user may create a profile corresponding to a first user account, which includes identification information of the first user through the service server 109b. The profile corresponding to the first user account may be displayed on the first user terminal 101 through a profile interface. Authentication information may be mapped to the first user account, which is described later.

A method of delivering signed content, performed by the server 109, may include operation 110 of performing user authentication, operation 120 of storing authentication information, operation 130 of signing inputted content, operation 140 of transmitting content signed by a first user, operation 150 of receiving content signed by a second user, operation 160 of visualizing signed content, and operation 170 of forwarding the content signed by the second user. For reference, herein, content may include a character string input by a user, an image (e.g., a still image and/or a video), an emoticon, and an emoji, and the like.

In operation 110, a user who signs up for a service may perform user authentication on the authentication server 109a via a user terminal (e.g., the first user terminal 101 of the first user). User authentication may represent an operation of authenticating whether personal information input by a user and preregistered personal information of a service user match each other. For example, user authentication may include a mobile phone user authentication, which verifies a name and resident registration number of an actual user input from a user by transmitting, by the authentication server 109a, an authentication number to a user terminal activated by a name of a service user, and a self-authentication, which uses a certificate issued in the name of the service user. A certificate may be an electronic certificate in which subject information is added to a public key (e.g., digital signature verification information) required for identity verification and an electronic signature in an electronic transaction, and include an official authentication certificate, a joint authentication certificate, a browser certificate, and the like.

In operation 120, the server 109 (e.g., the authentication server 109a) may store authentication information. The authentication server 109a may obtain authentication information corresponding to a user account through user authentication, and may store and manage the obtained authentication information corresponding to the user account. The authentication server 109a may map the authentication information to the user account. Authentication information may include authenticated personal information based on user authentication. For example, the authentication information may include authenticated real name information and authenticated qualification information. Authenticated real name information may correspond to real name information of the user authenticated through the user authentication. Authenticated qualification information may verify identity, status, and ability of a user represented in a user account. For example, the authenticated qualification information may include a driver's license, a student identity (ID) card, an employee ID card, an occupational license (e.g., a lawyer's license), and other certificates.

For example, the service server 109b may receive authentication information mapped to the first user account from the authentication server 109a, and add the authentication information to a profile of the first user account of which user authentication is completed. The first user terminal 101 may display the authentication information added to the profile in a profile interface. For reference, in response to the authentication information being mapped to the first user account, the first user terminal 101 and/or the service server 109b may allow a signing operation, which is described later.

In operation 130, the first user terminal 101 may sign inputted content. According to an example embodiment, the first user terminal 101 may receive content in response to an input of the first user. The first user terminal 101 may sign the content inputted in response to the input of the first user using authentication information of the first user. Herein, signing content may mean an operation of adding at least a portion of authentication information of a user and/or information related to the authentication information of the user to metadata of content inputted to a service application. According to an example embodiment, the content signed by the first user may have metadata to which at least a portion of the authentication information of the first user and/or information related to the authentication information of the first user are added.

According to an example embodiment, the first user terminal 101 may request signature authentication before performing a signing operation on content. Signature authentication may be authentication for determining whether to allow a signing operation in addition to the above-described user authentication. Signature authentication may refer to an operation of determining whether information preregistered in a first user account for signing and authentication request information input for signing content match. For example, signature authentication may include an operation of determining whether information preregistered in the first user account 101 and authentication request information input for signing content match. As another example, the signature authentication may include an operation of transmitting, by the first user terminal 101, the authentication request information to the authentication server 109a and a request to check whether the information is registered, an operation of determining, by the authentication server 109a, whether the authentication request information and information preregistered in the authentication server 109a match, an operation of transmitting, by the authentication server 109a, a result of the determining to the first user terminal 101, and an operation of receiving, by the first user terminal 101, the result of the determining from the authentication server 109a. The preregistered information and the authentication request information may be, for example, a personal identification number (PIN), and/or biometric information (e.g., fingerprint, face, iris, and vein) of a first user. The first user terminal 101 may perform a signature authenticating operation in response to detecting an input and/or a command that triggers a signing operation on content.

For example, in response to an attempt to sign one or more contents, the first user terminal 101 may request signature authentication whenever each of the one or more contents needs to be signed. The first user terminal 101 may sign content of which signature authentication is successful among the one or more contents using authentication information. Accordingly, the first user terminal 101 may individually perform signature authentication for each of a plurality of contents.

As another example, the first user terminal 101 may allow the one or more contents to be signed for a predetermined period of time in response to signature authentication for signing being successful. Accordingly, the first user terminal 101 may sign the plurality of contents for a predetermined period of time after successful signature authentication, thereby minimizing a number of signature authentication operations for respective signatures of the contents, and improving user convenience.

As yet another example, in response to signature authentication for signing being previously applied to a chat room with a second user, the first user terminal 101 may skip signature authentication and sign content in the chat room. Accordingly, in response to signature authentication being already successful in a chat room with another user, the first user terminal 101 may allow a plurality of contents to be signed while not limiting a number of contents to be signed.

In addition, the first user terminal 101 may request signature authentication before content is signed and/or before the content is transmitted to another user terminal (e.g., the second user terminal 102 and the third user terminal 103). For example, the first user terminal 101 may receive an input of content in response to a signature input of a user. A signature input is an input that triggers a signing operation, which is described with reference to FIGS. 3A to 5. For reference, inputting content and inputting a signature may be performed at different times, and thus a content input time and a signature authenticating time may be independent of each other.

For example, the first user terminal 101 may request signature authentication for signing content at one or more of a time before an input of the content is received, a time when the input of the content is being received, and a time after the input of the content is received. In response to signature authentication requested by the first user terminal 101 at the time before the input of the content is received being successful, the first user terminal 101 may generate signed content after the input of the content is completed. In response to signature authentication requested by the first user terminal 101 at a time when the input of the content is being received being successful, the first user terminal 101 may generate signed content after the input of the content is completed. In response to signature authentication requested by the first user terminal 101 at the time after the input of the content is received being successful, the first user terminal 101 may generate signed content. However, in response to signature authentication not being successful, the first user terminal 101 may stop and/or terminate a signing operation on content to prevent content with no successful signature authentication from being signed.

For example, it may be possible to sign content only when the content is being generated. However, examples are not limited thereto, and a first user may sign only content that the first user creates. As another example, only previously signed content may be additionally signed.

In operation 140, the first user terminal 101 may transmit signature information or content signed by the first user. For example, the service server 109b may receive signed content from the first user terminal 101 to deliver the content to the second user terminal 102.

In operation 150, the first user terminal 101 may receive content signed by a second user, for example, from the second user terminal 102 via the service server 109b. Like in operation 140, the service server 109b may receive signed content from the second user terminal 102 to deliver the content to the first user terminal 101. The example of receiving the content signed by the second user from the second user terminal 102 is illustrated in FIG. 1 for ease of description, and examples are not limited thereto. The second user terminal 102 may transmit the signature information or content signed by a user other than the second user to the first user terminal 101.

In operation 160, the first user terminal 101 may visualize signed content. For example, the first user terminal 101 may output the content signed by the first user in operation 130 and the content signed by the second user and received in operation 150 through a display. Signed content may be visualized with an authentication representation applied thereto. Applying an authentication representation to signed content is described with reference to FIGS. 3A to 5.

In operation 170, the first user terminal 101 may forward content signed by the second user. For example, the first user terminal 101 may forward the content signed by the second user as it is to the third user terminal 103 of a third user without changing, forging, or modulating the content. Additional signature information may be added to metadata of signed content, which is described later with reference to FIG. 5.

Hereinafter, the first user terminal 101 may be referred to as an electronic apparatus, the second user terminal 102 may be referred to as another electronic apparatus, and the third user terminal 103 may be referred to as another electronic apparatus.

Figure 2:
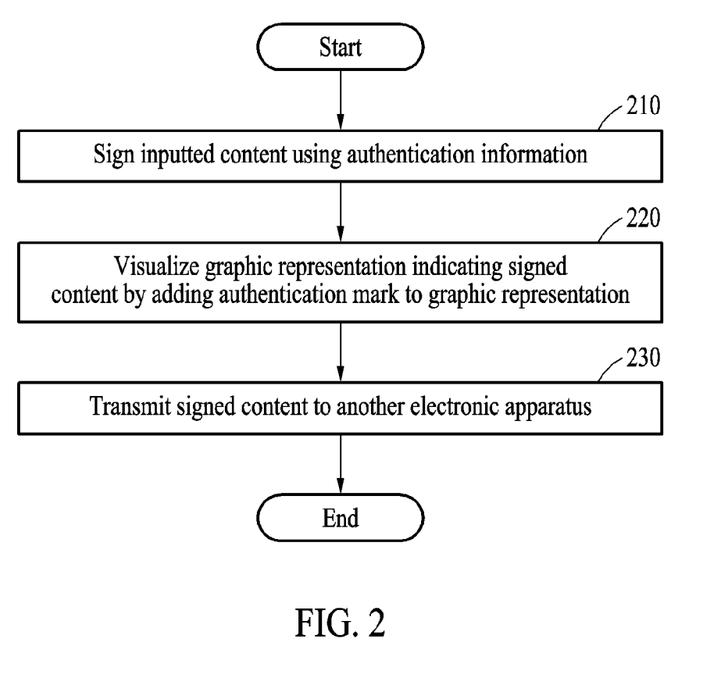
FIG. 2 is a flowchart illustrating a method of operating an electronic apparatus for delivering signed content according to an example embodiment.

FIG. 2 is a flowchart illustrating a method of operating an electronic apparatus for delivering signed content according to an example embodiment.

In operation 210, an electronic apparatus may sign content (e.g., content inputted in text input window and/or previously created content) inputted in response to an input of a first user of the electronic apparatus using authentication information of the first user. For example, the electronic apparatus may input content to a service application while executing the service application in response to the input of the first user. The electronic apparatus may perform a signing operation on the content inputted to the service application using authentication information in response to a signature input. As described above, the electronic apparatus may request signature authentication when triggering a signing operation caused by a signature input. The electronic apparatus may generate signed content by performing a signing operation on content. For example, signed content may include metadata to which a profile corresponding to authentication information is added. As another example, the signed content may include metadata to which qualification information is added among the authentication information. Metadata added to content by a signing operation may be referred to as signature information.

According to an example embodiment, the electronic apparatus may sign content using authentication information stored in the electronic apparatus before the content is inputted. Accordingly, the electronic apparatus may provide a content signature service only to a user of which user authentication is completed. For example, signature information of content signed by a user may be valid even if authentication information mapped to a user account of the user is invalid. However, examples are not limited thereto. The signature information of the content signed by the user may be valid only while the authentication information mapped to the user account is valid, and if the authentication information becomes invalid the signature information of the signed content may also become invalid. The electronic apparatus and/or a service server may remove signature information and/or an authentication representation from content in response to authentication information expiring.

For example, in response to a user accessing a message application from multiple apparatuses, the electronic apparatus (e.g., a smartphone) may send a request to the service server to update a message input from another electronic apparatus (e.g., a personal computer (PC)). The electronic apparatus may receive a plurality of messages input by another apparatus from the service server, and content to which signature information is added may be included in the messages. In response to the electronic apparatus requesting content to which signature information is added in a chat room from a service server, the service server may compare signature information corresponding to an authentication representation of each content with authentication information of a user to send a request to an authentication server to check whether the authentication information has expired, and the service server may also determine whether to maintain the authentication representation according to whether the authentication information has expired.

In operation 220, in response to the signing being successful, the electronic apparatus may visualize a graphic representation indicating the signed content by applying an authentication representation corresponding to authentication information to the graphic representation. For example, in response to content being a character string, a graphic representation indicating the content may be in a form of a speech balloon containing the character string. As another example, in response to content being an image, a graphic representation indicating the content may be a thumbnail of the image. An authentication representation is a graphic representation indicating that content is signed, and may be a graphic representation indicating a signed status. For example, an authentication representation is a graphic representation indicating an original author of content, and may be an authentication mark being a shape corresponding to a profile corresponding to authentication information of the original author. However, authentication representation is not limited thereto, and may be in a variety of forms according to information to be added to metadata of content. For example, in response to qualification information being added to content as metadata, a symbol (e.g., a lawyer mark in response to qualification information corresponding to a lawyer being added) indicating corresponding qualification information may be applied to a graphic representation indicating the content as an authentication representation. As another example, a border shape and/or color of an authentication representation may be different from a basic border of a graphic representation indicating content. As yet another example, an authentication representation may be a representation (e.g., the character string "signed message") indicating information related to authentication to be integrated into content, and may be visualized as a graphic representation (e.g., a representation in which a message character string and the character string "signed message" are combined) in which the authentication representation and the content are combined.

In operation 230, the electronic apparatus may transmit the signature information or the signed content to another electronic apparatus of the second user. A communicator of the electronic apparatus may establish communication with a server, and may transmit the signature information or content to another electronic apparatus via the server.

The method described above illustrated in FIG. 2 may be performed in a different order. For example, above-described operations 220 and 230 may be performed in an order opposite to that mentioned above, or may be performed simultaneously.

Figure 3A:
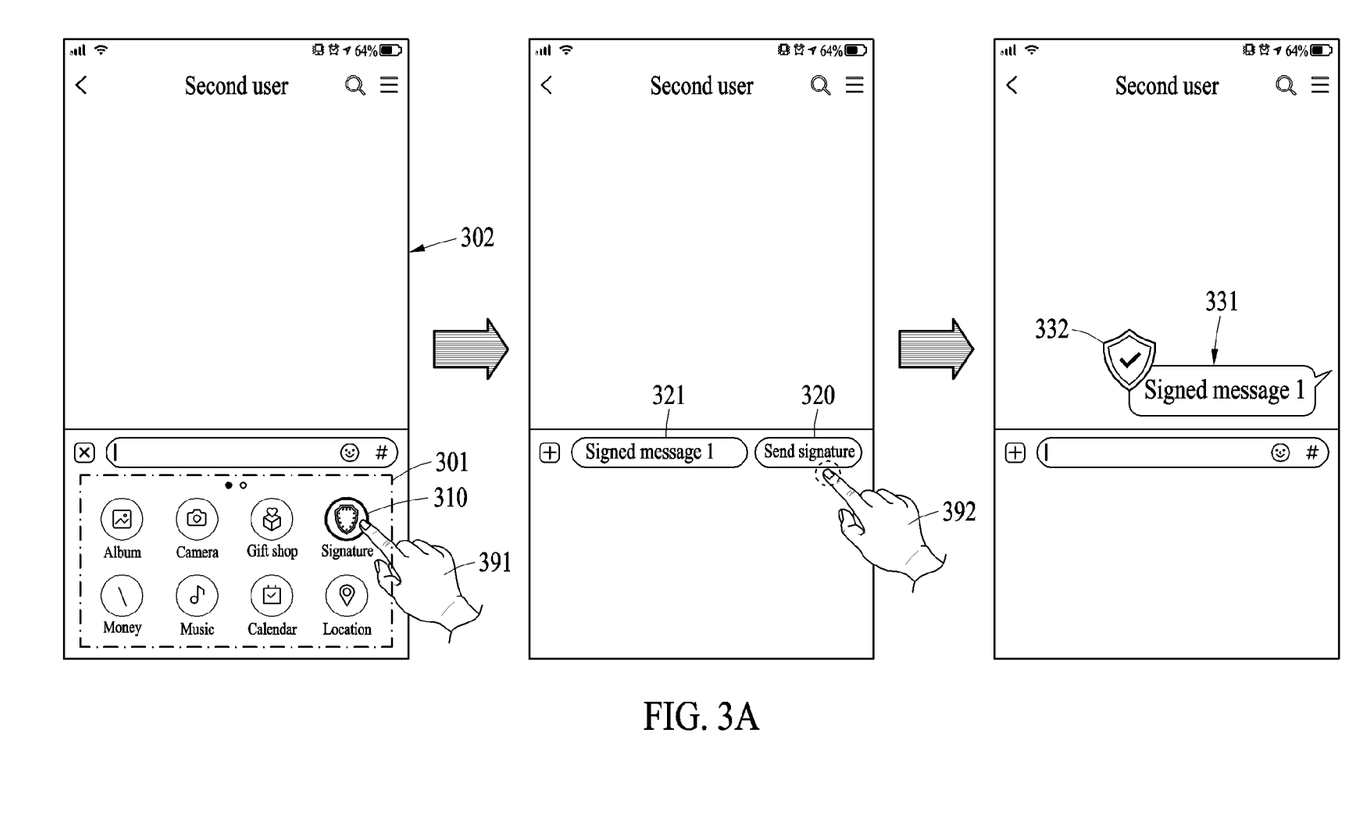
FIGS. 3A, 3B, and 4 are diagrams illustrating examples of signing content in an instant messaging service (IMS) application according to an example embodiment.
Figure 3B:
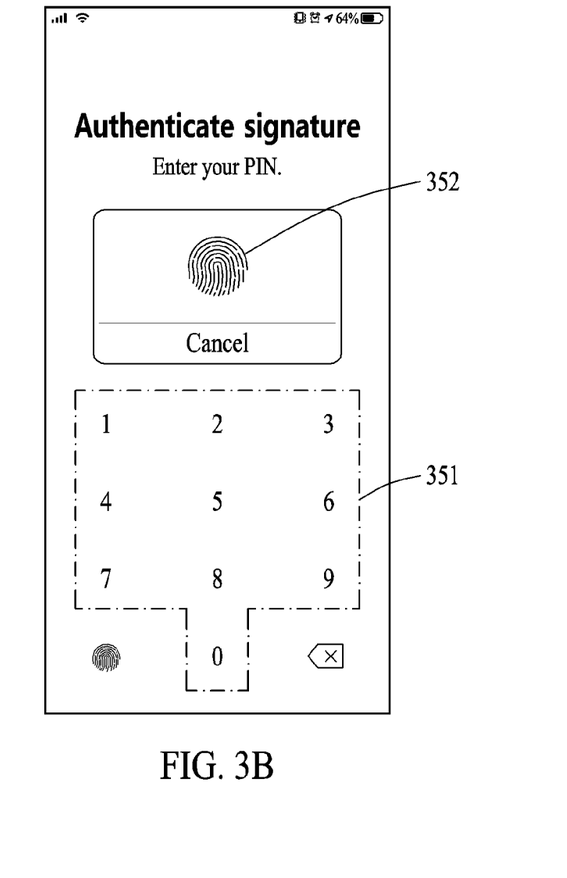
Figure 4:
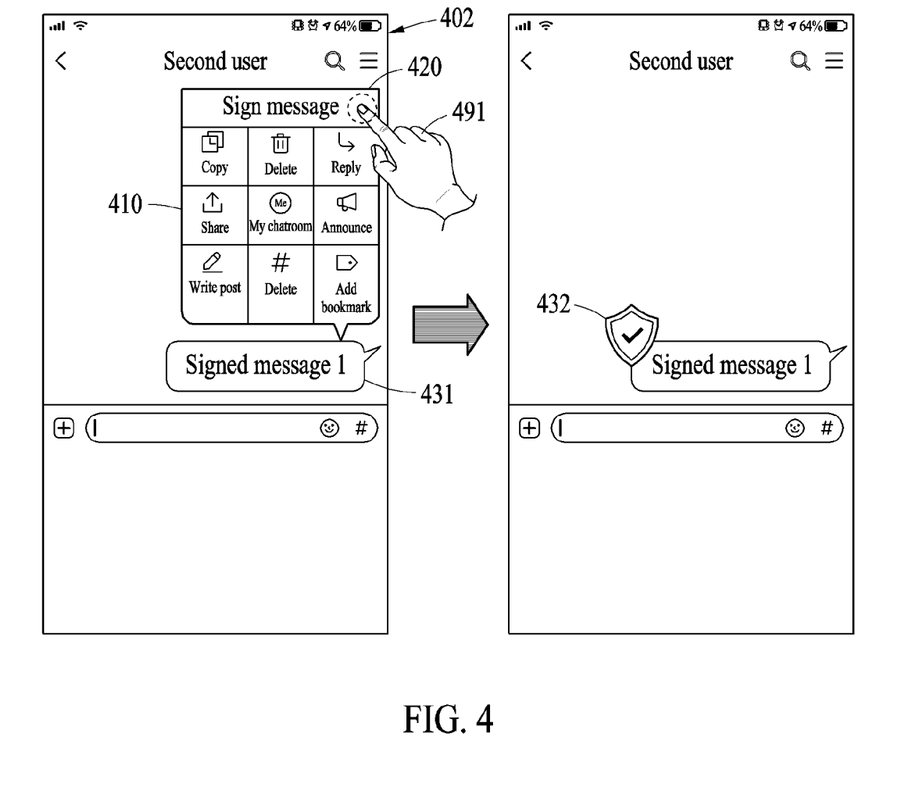

FIGS. 3A, 3B, and 4 are diagrams illustrating examples of signing content in an IMS application according to an example embodiment.

FIG. 3A illustrates an example of signing while inputting content.

According to an example embodiment, an electronic apparatus of a first user may output a screen 302 corresponding to a chat room with a second user account of a second user on a display. The electronic apparatus may present additional menu items 301 to the first user. The additional menu items 301 may include an item related to a menu provided in addition to a character string input in a service application (e.g., an IMS application). The additional menu items 301 may include, for example, a signing item 310.

In response to the signing item 310 being input (e.g., a signature input 391) by the first user, the electronic apparatus may provide a text input window 321. The signature input 391 may be an input to select the signing item 310 among the items output on the display, and may be a touch input. The text input window 321 may include an area in which a character string to be signed may be input in a screen on which a service application is displayed. In response to an input (e.g., a character string input, an input for attaching an image, and the like) of the first user, the electronic apparatus may input content in an allocated area in the text input window 321. In response to an input (e.g., a signed content transmission input 392) of the first user, the electronic apparatus may perform a signing operation on the content inputted to the text input window 321. The signed content transmission input 392 may be an input to select and execute an object 320 for transmitting the content inputted to the text input window 321. For reference, a time a signing operation is performed is not limited to the time indicated by the above-mentioned description, and the signing operation may be performed at one or more of a time when the signature input 391 is received, a time after the signature input 391 when content is inputted, and a time when the signed content transmission input 392 is received.

In response to completion of the signing operation, the electronic apparatus may transmit the signed content to another electronic apparatus of the second user. When the signed content is transmitted and the other electronic apparatus receives the signed content, the electronic apparatus may display a graphic representation 331 indicating the signed content by applying an authentication representation 332 to the graphic representation 331. Herein, a shield-shaped authentication mark is illustrated as an example of an authentication representation; however, this is merely for explanation purposes, and examples are not limited thereto. An authentication representation may be overlaid on at least a portion of a graphic representation indicating content, or may be disposed in an area near the graphic representation indicating the content.

For example, the electronic apparatus may display an authentication representation corresponding to qualification information among authentication information by applying the authentication representation to content. An authentication representation may guarantee that content is created by an original author having corresponding qualification information. If a first user is a lawyer and an authentication representation corresponding to a qualified lawyer is added to content, it may be guaranteed that the content is created by an author who is a licensed lawyer.

FIG. 3B illustrates an interface for authenticating a signature.

In response to detecting an input and/or a command that triggers a signing operation on content, an electronic apparatus may perform a signature authenticating operation. According to an example embodiment, the electronic apparatus may provide an interface for authenticating a signature at a time when the signature input 391 is detected or a time before content is transmitted when the content transmission input 392 illustrated in FIG. 3A is detected.

For example, the electronic apparatus may provide a keypad 351 for inputting a personal identification number (PIN) in the interface for authenticating a signature. In response to matching between the input PIN and information prestored in the electronic apparatus and/or a server being successful, the electronic apparatus may perform a signing operation on content.

As another example, the electronic apparatus may request for an input of biometric information 352 in the interface for authenticating a signature. In response to matching between the input biometric information (e.g., fingerprint) and information prestored in the electronic apparatus and/or a server being successful, the electronic apparatus may perform a signing operation on content.

FIG. 4 illustrates an example of signing content created by an apparatus accessed by a first user using a first user account.

In response to a signature input of a user for previous content 431 created by the user among contents displayed on a screen corresponding to a chat room with a second user account to (e.g., content previously transmitted to a second user), an electronic apparatus according to an example embodiment may sign the previous content 431 (e.g., content inputted by the first user) using authentication information. For example, in response to a pop-up input for the previous content 431 created by a first user among content displayed on a screen 402 corresponding to a chat room with a second user account of a second user, the electronic apparatus may output a pop-up menu 410. The pop-up input may be, for example, an input (e.g., a touch input) by the first user to select the previous content 431 that remains even after a threshold time expires. The pop-up menu 410 may include items, such as a signing item 420 as illustrated in FIG. 4, instructing multiple operations related to the previous content 431.

The electronic apparatus and/or a server may transition the previous content 431 to signed content. For example, in response to a signature input 491 for the previous content 431, the electronic apparatus may sign the previous content 431 or transmit the signature information for signing. The electronic apparatus may visualize a graphic representation indicating the previous content 431 by applying an authentication representation 432 to the graphic representation. In addition, the electronic apparatus may send a request to at least one of another electronic apparatus of the second user and a server to transition the previous content 431 to signed content. In response to receiving a transition request from the electronic apparatus, a server may add signature information of a first user to metadata of content. In response to receiving signature information from a server, another electronic apparatus may update metadata of content created by a first user.

Figure 5:
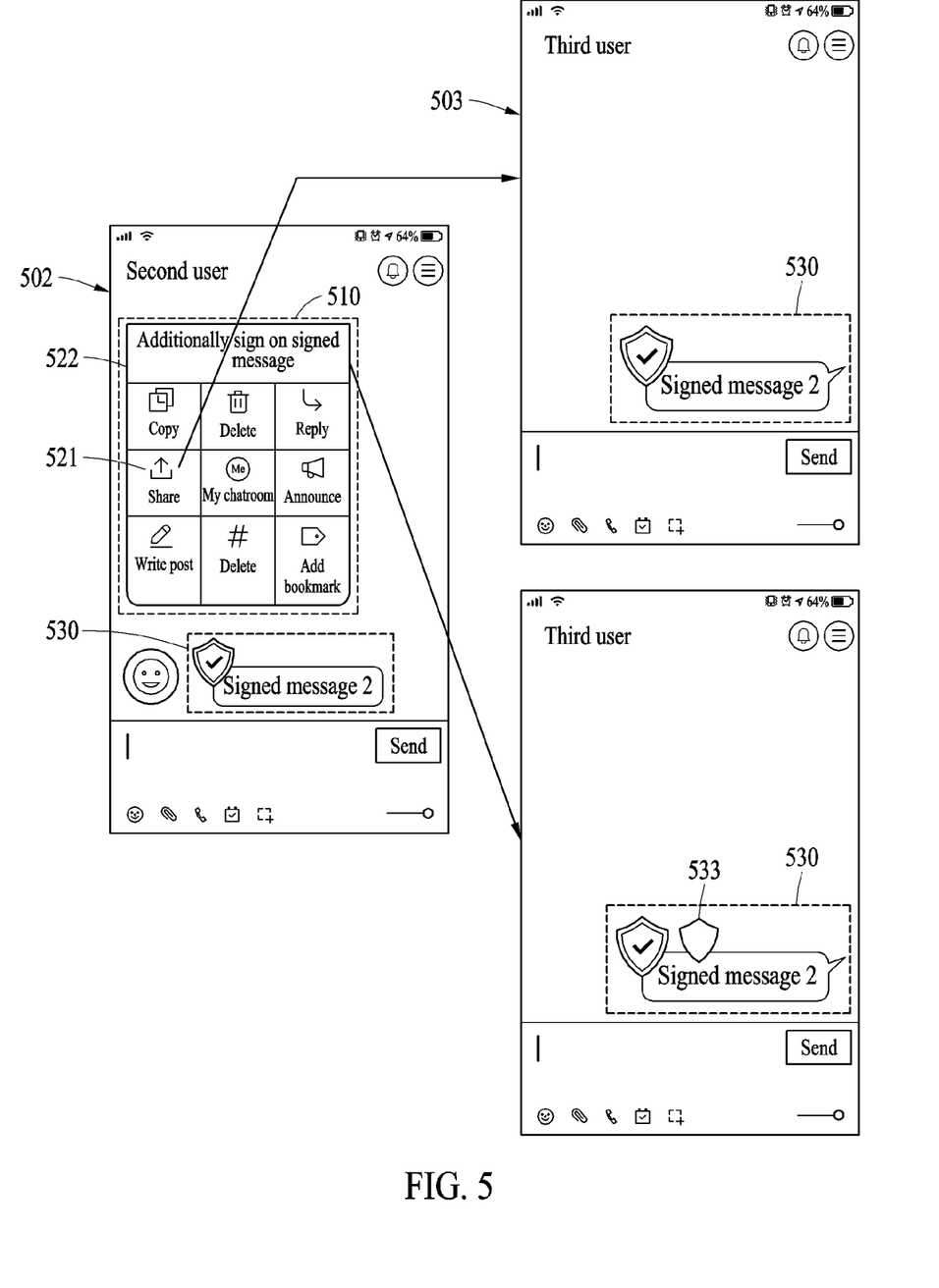
FIG. 5 is a diagram illustrating an example of delivering and additionally signing content signed by another user.

FIG. 5 is a diagram illustrating an example of delivering and additionally signing content signed by another user.

An electronic apparatus according to an example embodiment may receive other content signed by a second user from another electronic apparatus. The electronic apparatus may visualize a graphic representation indicating other content 530 by applying an authentication representation corresponding to the second user to the graphic representation.

For example, in response to a pop-up input for the other content 530 among content displayed on a screen 502 corresponding to a chat room with a second user account of the second user, the electronic apparatus may output a pop-up menu 510. The pop-up menu 510 may include a sharing item 521 and a further signing item 522. The sharing item 521 may be an item for sharing a message, for example, an item for simply forwarding a message without changing the message. In response to content to be forwarded by an input to select the sharing item 521 being signed content, the electronic apparatus may forward the signed content while maintaining signature information. The further signing item 522 may be an item for applying an additional signature to a signed message. For example, in response to an input to select the further signing item 522, the electronic apparatus may deliver content to which a signature is applied in addition to an existing signature to an existing chat room or another chat room. An existing chat room may be a chat room where content is provided when the content only has an existing signature.

In response to an input (e.g., an input to select the sharing item 521) of a first user, the electronic apparatus may forward the other content 530 to another electronic apparatus of a third user while maintaining signature information of the another content 530. The electronic apparatus may display the other content 530 with signature information by the second user maintained on a screen 503 corresponding to a chatroom with a third user account. Accordingly, it may be guaranteed that contents created by an original author may be forwarded without being forged and/or modulated.

In response to an input (e.g., an input to select the further signing item 522) of the first user, the electronic apparatus may add signature information of the first user to the other content 530 to which the signature information of the second user is applied. The electronic apparatus may provide the other content 530 to which the signature information of the first user and the signature information of the second user are added, and may forward the other content 530 to the another electronic apparatus of the third user. In other words, the electronic apparatus may forward the content 530 that is additionally signed to an existing chat room with the second user or to another chat room with the third user. Alternatively, the electronic apparatus may additionally apply an authentication representation 533 corresponding to the signature information of the first user to the other content 530 and display the authentication representation 533. Therefore, content created by a second user may be guaranteed by a first user, and accordingly, reliability of signed content may be improved.

According to another example embodiment, an electronic apparatus may generate duplicated content by copying and pasting signed content along with signature information. The electronic apparatus may maintain signature information in metadata of the duplicated content while copying the signed content. After generating the duplicated content, the electronic apparatus may keep the signature information added to the metadata of the duplicated content to be the same as signature information of original content before changing the duplicated content. In response to detecting a change in the duplicated content, the electronic apparatus may remove an authentication representation from the duplicated content. Accordingly, the electronic apparatus may guarantee integrity of content to which an authentication representation is applied by removing an authentication representation from content of which integrity is not verified.

According to yet another example embodiment, an electronic apparatus may copy only content of signed content, excluding signature information. In other words, the electronic apparatus may prevent signature information from being duplicated while copying signed content.

According to an example embodiment, an electronic apparatus may include a processor, a display, and a communicator.

The processor may sign content inputted in response to an input of a first user of the electronic apparatus using authentication information of the first user. The processor may temporarily or permanently store data required to perform a method of delivering signed content in a memory.

In response to the signing being successful, the display may visualize a graphic representation indicating the signed content by applying an authentication representation corresponding to authentication information to the graphic representation. The display may be, for example, a touch display in which a touch sensing module and a display module are combined to be implemented.

The communicator may transmit the signature information or the signed content to another electronic apparatus of a second user. The communicator may establish a wired communication channel and/or a wireless communication channel with an external apparatus (e.g., another electronic apparatus and a server), and may establish communication via a long-range communication network, such as cellular communication, short-range wireless communication, local area network (LAN) communication, Bluetooth, wireless-fidelity (Wi-Fi) or infrared data association (IrDA), a legacy cellular network, a fourth generation (4G) and/or 5G network, next-generation communication, the interne, or a computer network (e.g., LAN or a wide area network (WAN)).

Descriptions of operations of each component of a server and an electronic apparatus is not limited to the descriptions represented above, and the description of the operations represented above with reference to FIGS. 1 to 5 may be applied to the server and the electronic apparatus.

The example embodiments described herein may be implemented using a hardware component, a software component and/or a combination thereof. A processing device may be implemented using one or more general-purpose or special-purpose computers, such as, for example, a processor, a controller and an arithmetic logic unit (ALU), a digital signal processor (DSP), a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed to for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described examples, or vice versa.

As described above, although the examples have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of delivering signed content, performed by an electronic apparatus, the method comprising:
   signing content of a message in a chat room being inputted by a first user of the electronic apparatus by:
      based on determining that the first user has been authenticated with a service providing the chat room using first credentials, providing a user interface element prompting input of second credentials;
      receiving, via the user interface element, the second credentials;
      sending, to a server, the second credentials;
      retrieving, from the server and in response to the second credentials, authentication information mapped to a user account of the first user; and
      adding, to the message, at least a portion of the authentication information;
   visualizing a graphic representation indicating the signed content by applying, to a second user interface element comprising the message and in response to the signing being successful, an authentication representation corresponding to the authentication information; and
   transmitting signature information or the signed content to another electronic apparatus of a second user.

2. The method of claim 1, wherein the signing of the content comprises signing the content using the authentication information stored in the electronic apparatus before the content is inputted.

3. The method of claim 1, wherein the signing of the content comprises:
   requesting signature authentication for signing each of one or more contents, in response to an attempt to sign the one or more contents; and
   signing content of which the signature authentication is successful among the one or more contents using the authentication information.

4. The method of claim 1, wherein the signing of the content comprises, in response to signature authentication for the signing being successful, allowing one or more contents to be signed for a predetermined period of time.

5. The method of claim 1, wherein the signing of the content comprises, in response to signature authentication for signing being previously applied to the chat room with the second user, skipping the signature authentication and signing the content in the chat room.

6. The method of claim 1, wherein the signing of the content comprises:
   receiving an input of the content in response to a signing input by the first user; and
   requesting signature authentication to sign the content at one or more of a time before the input of the content is received, a time when the input of the content is being received, and a time after the input of the content is received.

7. The method of claim 1, wherein the content inputted by the first user is previous content created by the first user before a signing input of the first user among contents displayed on a screen corresponding to the chat room with a second user account, and
   the transmitting comprises transmitting, in response to a signing input of the first user, signature information for the previous content.

8. The method of claim 7, wherein the transmitting further comprises:
   sending a request at least one of the another electronic apparatus and a second server to transition the previous content to signed content.

9. The method of claim 1, further comprising:
   receiving other content signed by the second user from the another electronic apparatus; and
   visualizing a graphic representation indicating the other content by applying an authentication representation corresponding to the second user to the graphic representation.

10. The method of claim 9, wherein the transmitting of the signed content comprises, in response to the content of a message in a chat room being inputted by the first user, forwarding the other content to another electronic apparatus of a third user while maintaining signature information of the other content.

11. The method of claim 9, wherein the transmitting of the signed content comprises forwarding, to another electronic apparatus of a third user, the other content to which signature information of the second user is applied by adding signature information of the first user to the other content.

12. The method of claim 1, further comprising:
generating duplicated content by copying and pasting the signed content along with signature information; and
removing an authentication representation from the duplicated content in response to detecting a change in the duplicated content.

13. The method of claim 1, wherein the visualizing of the graphic representation comprises applying, to the content, a graphic representation indicating an original author of the content as the authentication representation.

14. An electronic apparatus comprising:
one or more processors; and
memory storing instructions that, when executed by the one or more processors, cause the electronic apparatus to:
sign content of a message in a chat room being inputted by a first user of the electronic apparatus by:
based on determining that the first user has been authenticated with a service providing the chat room using first credentials, providing a user interface element prompting input of second credentials;
receiving, via the user interface element, the second credentials;
sending, to a server, the second credentials;
retrieving, from the server and in response to the second credentials, authentication information mapped to a user account of the first user; and
adding, to the message, at least a portion of the authentication information;
cause visualization, on a display, of a graphic representation indicating the signed content by applying, to user interface element comprising the message and in response to the signing being successful, an authentication representation corresponding to the authentication information; and
transmit signature information or the signed content to another electronic apparatus of a second user.

15. The electronic apparatus of claim 14, wherein the instructions, when executed by the one or more processors, cause the electronic apparatus to sign the content using the authentication information stored in the electronic apparatus before the content is inputted.

16. The electronic apparatus of claim 14, wherein the content inputted by the first user is previous content created by the first user before a signing input of the first user among contents displayed on a screen corresponding to the chat room with a second user account, and
wherein the instructions, when executed by the one or more processors, cause the electronic apparatus to transmit, in response to a signing input of the first user, signature information for the previous content.

17. The electronic apparatus of claim 16, wherein the instructions, when executed by the one or more processors, further cause the electronic apparatus to:
cause visualization of a graphic representation indicating the previous content by applying an authentication representation to the graphic representation in the electronic apparatus, and
send a request to at least one of the another electronic apparatus and a second server to transition the previous content to signed content.

18. The electronic apparatus of claim 14, wherein the instructions, when executed by the one or more processors, further cause the electronic apparatus to:
forward, from the another electronic apparatus to another electronic apparatus of a third user, other content while maintaining signature information of the other content signed by the second user in response to the content of a message in a chat room being inputted by the first user.

19. The electronic apparatus of claim 14, wherein the instructions, when executed by the one or more processors, further cause the electronic apparatus to:
forward, to another electronic apparatus of a third user, other content to which signature information of the second user is applied by adding signature information of the first user.

20. One or more non-transitory computer-readable media storing instructions that, when executed by one or more processors of an electronic apparatus, cause the electronic apparatus to:
sign content of a message in a chat room being inputted by a first user of the electronic apparatus by:
based on determining that the first user has been authenticated with a service providing the chat room using first credentials, providing a user interface element prompting input of second credentials;
receiving, via the user interface element, the second credentials;
sending, to a server, the second credentials;
retrieving, from the server and in response to the second credentials, authentication information mapped to a user account of the first user; and
adding, to the message, at least a portion of the authentication information;
cause visualization, on a display, of a graphic representation indicating the signed content by applying, to user interface element comprising the message and in response to the signing being successful, an authentication representation corresponding to the authentication information; and
transmit signature information or the signed content to another electronic apparatus of a second user.

* * * * *